US008078830B2

United States Patent
Kleihorst et al.

(10) Patent No.: US 8,078,830 B2
(45) Date of Patent: Dec. 13, 2011

(54) PROCESSOR ARRAY ACCESSING DATA IN MEMORY ARRAY COUPLED TO OUTPUT PROCESSOR WITH FEEDBACK PATH TO INPUT SEQUENCER FOR STORING DATA IN DIFFERENT PATTERN

(75) Inventors: Richard P. Kleihorst, Kasterlee (BE); Antench A. Abbo, Eindhoven (NL); Vishal S. Choudhary, Bangalore (IN)

(73) Assignee: NXP B.V., Eindhoven (NL)

( * ) Notice: Subject to any disclaimer, the term of this patent is extended or adjusted under 35 U.S.C. 154(b) by 489 days.

(21) Appl. No.: 12/302,171

(22) PCT Filed: May 16, 2007

(86) PCT No.: PCT/IB2007/051882
§ 371 (c)(1),
(2), (4) Date: Nov. 24, 2008

(87) PCT Pub. No.: WO2007/135635
PCT Pub. Date: Nov. 29, 2007

(65) Prior Publication Data
US 2009/0119479 A1   May 7, 2009

(30) Foreign Application Priority Data
May 24, 2006   (EP) .................................... 06114509

(51) Int. Cl.
*G06F 15/80*   (2006.01)
(52) U.S. Cl. .......................................... 712/10; 712/225
(58) Field of Classification Search ........................ None
See application file for complete search history.

(56) References Cited

U.S. PATENT DOCUMENTS
4,731,724 A * 3/1988 Michel et al. ................. 710/100
4,918,527 A   4/1990 Penard et al.

FOREIGN PATENT DOCUMENTS
WO   2006027751 A1   3/2006

OTHER PUBLICATIONS

Fujita, Y., et al; "A Real-Time Vision System Using an Integrated Memory Array Processor Prototype"; Machine Vision and Applications, Springer Verlag, DE, vol. 7, No. 4, 1994, pp. 220-228; XP000677014; ISSN: 0932-8092.
Kyo, S., et al; "An Integrated Memory Array Processor Architecture for Embedded Image Recognition Systems"; Computer Architecture, 2005; ISCA 2005; IEEE Jun. 4, 2005; pp. 134-145; XP010807901.
Hsieh, J.Y.F., et al; "Tranpose Memory for Video Rate JPEG Compression on Highly Parallel Single-Chip Digital CMOS Imager"; Image Processing 2000; 2000 International Conference, Sep. 10-13, 2000, Piscataway, NJ, USA, IEEE; Sep. 10, 2000; pp. 102-105; XP01059413.

* cited by examiner

*Primary Examiner* — Kenneth Kim

(57) ABSTRACT

An integrated circuit arrangement has a processor array (2) with processor elements (4) and a memory (6) with memory elements (8) arranged in rows (32) and columns (30). The columns (30) of memory elements (8) are addressed by respective processor elements (4). An input sequencer (14) and feedback path (24) cooperate to reorder input data in the memory (6) to carry out both block and line based processing.

15 Claims, 3 Drawing Sheets

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

PROCESSOR ARRAY ACCESSING DATA IN MEMORY ARRAY COUPLED TO OUTPUT PROCESSOR WITH FEEDBACK PATH TO INPUT SEQUENCER FOR STORING DATA IN DIFFERENT PATTERN

The invention relates to a integrated circuit arrangement, particularly but not exclusively using a Single Instruction Multiple Data (SIMD) data processor array, as well as to a method of operation of an integrated circuit arrangement and a computer program for operating the integrated circuit arrangement.

In a SIMD processing array, each of a number of processing elements (PEs) receives the same instruction from a common instruction stream, and executes the instruction based on data unique to that processing element, which data may be termed local data. Such a processing array is suitable for highly repetitive tasks where the same operations are performed on multiple items of data at the same time, which may occur for example in the field of image processing.

FIG. 1 shows a classical SIMD array with a processor array 2 with a plurality of processing elements 4 and a memory 6 with a respective plurality of memory elements 8 arranged as columns 30. Each processing element 4 acts on the memory elements 8 of a respective column 30. An instruction input 26 accepts instructions in parallel for all processing elements.

In use, the processing elements 4 carry out the same instruction simultaneously, i.e. a common instruction, but on their respective memory elements 8.

The architecture provides a mechanism for each processing element to carry out the common instruction or not, that is the instruction input 26 accepts not merely the sequence of common instructions, but also data indicating which of the processing elements are to carry out each of the common instructions.

Such an architecture is very suitable for processing lines of data in parallel. For example, consider image processing applications. Such applications often need to process data on a pixel by pixel basis, and the parallel SIMD architecture of FIG. 1 can deliver excellent processing performance by processing a first line of data across an image, followed by the next line of data, each line of data being processed in parallel.

However, not all data processing proceeds on such a pixel by pixel basis and there is often a need to process blocks of data in parallel. For example, compression algorithms such as MPEG and JPEG use digital cosine transforms (DCTs) on eight by eight blocks. Each block represents an image square eight pixels across and eight high.

Consider as another example the case where it is necessary to calculate on a block i of eight elements $F_k^i$ for k=0, 1 ... 7 the operations:

$Q_0^i = F_0^i + C_0$ and $Q_k^i = F_k^i C_k$ (k=1, 2 ... 7)

To carry out the transform, each element is processed using a different coefficient depending on its position in the block.

Consider the case of a line of data corresponding to a horizontal line of sixty four pixels in an image, arranged in a row across memory elements 8, assuming that there are sixty four columns 30 and sixty four processing elements 4. The sixty four pixels of the line are included within eight different blocks, and the processing elements 4 need to carry out a different operation on the first pixel of each block, the second pixel of each block, and so on.

Thus, to carry out the processing in a SIMD array of the type illustrated in FIG. 1, the common instruction is to add $C_0$. This however is only the correct instruction for the first pixel of each block, and the processing elements of other pixels do not execute an instruction. Then, the second pixel of each block is processed using the instruction multiply by $C_1$, and so on. The result of this is that each instruction is only executed on one in eight of the processor elements 4.

Thus, data processing on blocks in this way does not utilise the full power of the SIMD array.

Although this is a simple example, similar processing difficulties occur generally with block-based processing of SIMD arrays.

It would of course be possible to carry out some processing operations on a SIMD array and others on a more conventional processor, but in general it is convenient to be able to carry out all processing operations on a single type of device. Thus, there is a need to improve the processing performance of SIMD arrays for block processing operations.

A specific SIMD array processor designed with a slightly different objective is described in WO2006/027751 (Philips). This provides for communications between columns of data by allowing processor elements 4 not merely to access their own columns of data 30 but also an adjacent column 30. This can be helpful in certain processing operations.

WO2006/027751 also describes ways in which pixels can be grouped together in memory elements for processing. For example, in one arrangement, the first column includes the first two red pixels, the first two green pixels, then the first two blue pixels. The next column includes the next two red pixels, the next two green pixels, and the next two blue pixels. This continues across the array. Thus, each column includes one pair of pixel values. This allows a line of data having a certain number of pixels to be processed using only half the number of processing elements.

However, this arrangement does not solve the problem of improving the processing performance of SIMD arrays for certain common types of block processing.

According to the invention there is provided an integrated circuit arrangement, comprising:

a processor array with plurality of processor elements for processing data in parallel;

a memory array including a plurality of memory elements accessible in parallel by the plurality of processor elements;

a data input for accepting data;

an input sequencer arranged to accept input data and to store data in the memory elements of the memory array;

an output processor for taking data from the memory array;

a controller for controlling the processor array; and a feedback path from the output processor to the input sequencer, the input sequencer being arranged to accept input data from the data input and/or from the feedback path and the output processor being arranged to take data from the memory array and to output the data from the memory array on an output and/or to send the data from the memory array back to the input sequencer along the feedback path.

By providing an input sequencer and feedback path, data may be arranged more efficiently for parallel processing and hence the efficiency of data processing can be improved. In particular, data can be rearranged to allow for multiple operations to be performed efficiently even when the operations require different data arrangements.

For example, the integrated circuit arrangement may process image data arranged in lines of data as lines of data for pixel based operations and can then rearrange the data differently in the memory elements for block based operations.

The processor array may be a SIMD.

The memory array may in particular have an array of columns of memory elements, each column being addressable by a respective one or more of the processor elements.

The controller may be arranged to cause the integrated circuit arrangement to operate selectably in one of a plurality of modes, wherein the input sequencer is arranged to store input data in the memory elements in different arrangements depending on the selected mode.

One of the modes may be a column processing mode in which the input sequencer is arranged to accept a sequence of data items as input data and to store the data items in the memory elements starting with the one of the columns of memory elements, followed by subsequent columns of memory elements in turn.

One of the modes may be a row processing mode in which the input sequencer is arranged to accept a sequence of data items as input data and to output the data items to the memory array in rows starting with one of the rows of memory elements followed by subsequent rows of memory elements in turn.

One of the modes may be a reordering mode in which the input sequencer is arranged to accept data items as input data on the data input and to output the data items to the memory array in a reordered sequence in the memory elements.

In the reordering mode the controller may cause data items to flow around the path from the input sequencer, memory elements, output processor and feedback path back to the input sequencer to store the data items in the memory elements in the reordered sequence.

The controller may be arranged to store input data in the memory elements in a first pattern, to carry out processing on the data in that pattern, and then to output data from the memory elements through feedback path and input sequencer to rearrange the data in a different pattern in the memory elements and then to carry out further processing on the data in that different pattern.

In another aspect, the invention relates to a method of operating an integrated circuit arrangement with an input sequencer, a processor array with plurality of processor elements for processing data in parallel, a memory array having a plurality of memory elements accessible in parallel by the plurality of processor elements; and a feedback path from an output of the memory array to the input sequencer, the method comprising:

accepting input data in the input sequencer;

storing the input data in the memory elements in a first pattern; and outputting the data from the memory elements and sending the output data back through the feedback path and input sequencer and back into the memory elements in a different second pattern.

In another aspect, the invention relates to a computer program product including computer program code means arranged to cause integrated circuit arrangement as set out above to operate a method as set out above.

For a better understanding of the invention, embodiments will be described, purely by way of example, with reference to the accompanying drawings, in which.

Like or similar components are given the same reference numerals in different Figures. The Figures are schematic and not to scale.

Figure 2:
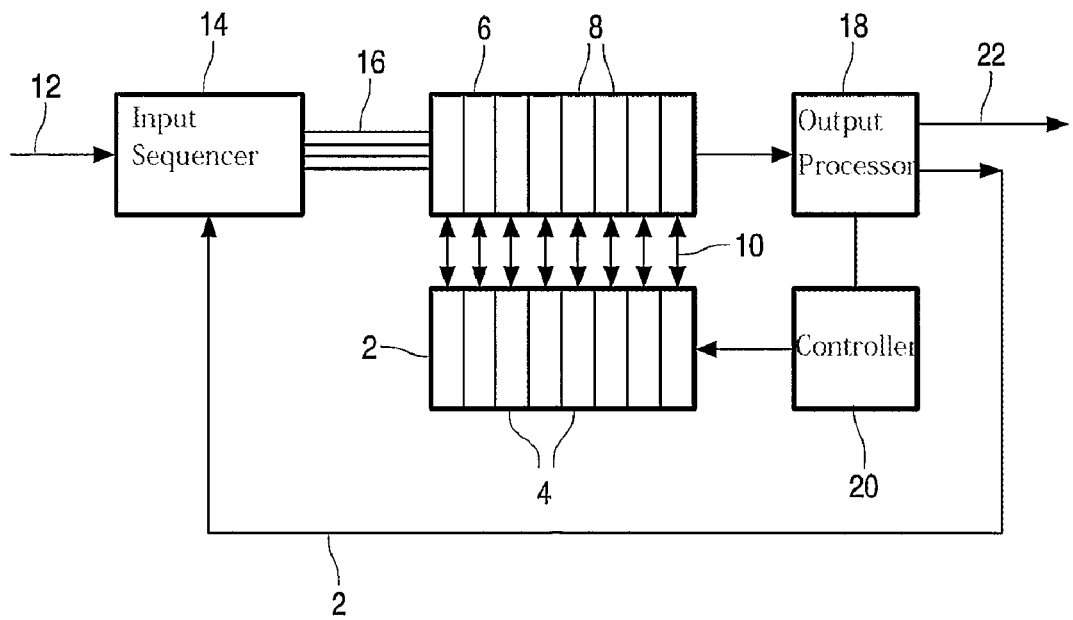
FIG. 2 shows a integrated circuit arrangement according to a first embodiment of the invention.

Referring to FIG. 2, a very simple example of an integrated circuit arrangement according to the invention will be discussed first. The example is a SIMD array which includes a processor array 2 including a number of processor elements 4 for processing in parallel and a memory array 6 including a number of memory elements 8. Parallel data paths 10 connect the processor elements 4 to respective memory elements 8.

Data is fed into the integrated circuit arrangement at input 12 into input sequencer 14 which sequences data as set out in more detail below, and passes the sequenced data directly to the memory elements 8 through direct memory access channel 16.

Output processor 18 takes the data from memory elements 8 and outputs it along output 22.

The output processor can also take the data from memory elements 8 and route them back to the input sequencer 14 by feedback path 24.

The data flow and processing is controlled by controller 20.

The components of the SIMD array are conveniently all integrated onto a single chip. However, alternatively certain components may be separate. For example, the feedback path 24 and/or input sequencer 14 may be implemented as a separate external feedback path and/or component. This may allow the SIMD array to be implemented on chips not specifically designed for the embodiments of the invention described.

The combination of the input sequencer 14 and feedback path 24 allows improved processing, as will now be explained. For clarity of description, the use of the SIMD array according to the invention will described with reference to a particular example. It should be noted however that the example is somewhat simpler than many examples suitable for processing in such an array. In particular, the example describes the use only of eight processor elements 4 and eight memory elements 8 in the processor and memory arrays 2,6 whereas practical implementations of an integrated circuit arrangement can have very many more elements than this.

Consider first the example above where it is necessary to calculate $$Q_0^i = F_0^i + C_0 \text{ and}$$

$$Q_k^i = F_k^i C_k \text{ (k=1, 2 ... 7)}$$

In this example, the input sequencer 14 reorders the data into blocks, so that each processor carries out processing on a single block.

Figure 1:
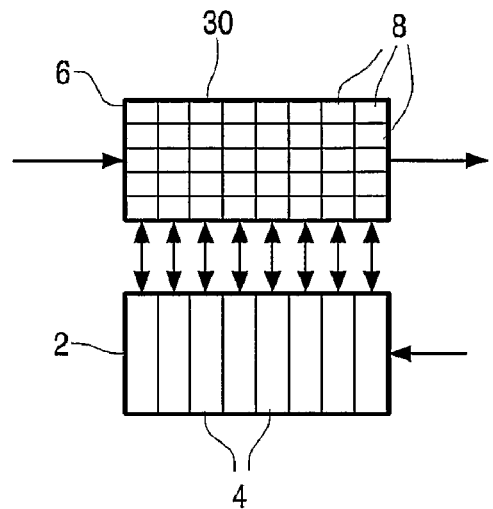
FIG. 1 shows a prior art SIMD array.

Firstly the input sequencer 14 delivers into the eight memory elements 8 the first element of each of eight blocks. The processor elements 4 then carry out the instruction "add $C_0$" on all memory elements 8 in parallel. Then, the sequencer delivers the second element of each block into the respective memory elements 8, and the instruction "multiply by $C_1$" is carried out on all blocks in parallel. Thus, in the example, processing is carried out in parallel with a resulting much higher efficiency than would take place using the processor of FIG. 1.

The feedback path 24 allows intermediate results to be sent back to the input sequencer 14 for further processing. It can also be used to reorder data, as will be described below.

A more realistic example of an IC arrangement of the present invention will now be illustrated with respect to FIG.

3, which shows an array of memory elements 8 arranged in columns 30 and rows 32. Each processor operates not on a single memory element 8, but on a column 30. Each of the columns may be referred to as a "line memory". Each of the columns 30 includes eight memory elements 8 in this specific example, and there are sixty four columns 30 in parallel, though alternatives are possible and in particular there may be many more rows and columns. For clarity, the full array of memory elements 8 is not shown in FIG. 3. The rows 32 of memory elements 8 are made up of memory elements that may be processed in parallel—see FIG. 3.

Figures 3, 4:
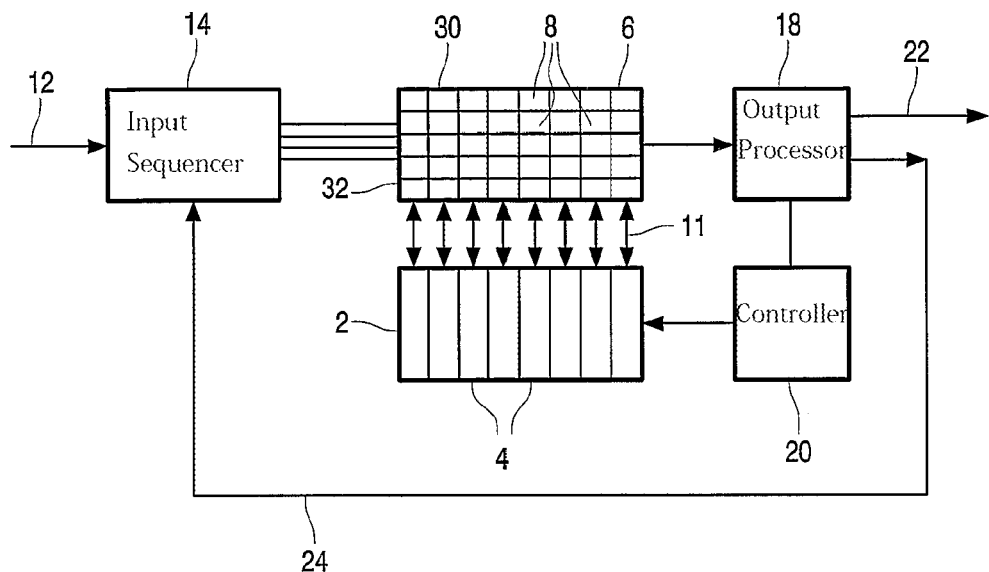
FIG. 3 shows a integrated circuit arrangement according to a second embodiment of the invention.
FIG. 4 illustrates an 8×8 block of data.

The terms "row" and "column" when applied to memory elements 8 are essentially arbitrary but this specification will use rows 32 and columns 30 corresponding to the orientation of FIG. 3. Note also that a row 40 of data (FIG. 4) may be stored in the first column 30 of the memory elements.

As an example of processing, using the example of FIG. 3, consider the case of carrying out DCT processing of the type used in image compression which operates on blocks of sixty four pixels arranged as an eight by eight array. The pixels will be numbered from 0 to 63 as illustrated in FIG. 4, with the rows 40 being arranged across FIG. 4 and the columns 42 vertically in FIG. 4. Thus, elements zero to seven constitute a row of data.

The sequence of blocks is sent to the input sequencer 14 along input 12 as a sequence of data items, each representing one pixel. The pixels of the first block are sent in order from element zero to sixty three. This is followed by elements zero to sixty three, in order, of the second block, and this continues until the eighth block.

These eight blocks provide the data to fill the sixty four line memories 30 each with eight elements. The input sequencer 14 fills the input data into memory elements 8 as follows. The first eight elements, elements 0 to 7 of the first block, are stored in the first column 30, the second eight elements, elements 8 to 15 of the first block, are stored in the second column 30, and so on until the end of the first block. Thus, representing the k-th data element of the i-th block as $D_{ik}$ where i=0, 1 . . . 7 and k=0, 1, 2 . . . 63 the elements fill the memory elements 8 in accordance with a first pattern as follows:

| Column | Data |
| --- | --- |
| 0 | $D_{0,0} D_{0,1} D_{0,2} \ldots D_{0,7}$ |
| 1 | $D_{0,8} D_{0,9} D_{0,10} \ldots D_{0,15}$ |
| . . . | |
| 7 | $D_{0,56}, D_{0,57} D_{0,58} \ldots D_{0,63}$ |
| 8 | $D_{1,0} D_{1,1} D_{1,2} \ldots D_{1,7}$ |
| . . . | |
| 63 | $D_{7,56}, D_{7,57} D_{7,58} \ldots D_{7,63}$ |

The processors 4 then carry out processing in parallel on the columns 30. Each column contains one row of data of the original block (compare the above table with FIG. 4). This operates efficiently since each processor can carry out the same instruction at the same time.

The DCT on eight by eight blocks carries out the cosine transform on both rows and columns, and the ordering of data above is suitable for carrying out the first transform (on the columns 42 of FIG. 4) in parallel. However, if the same arrangement of data is used to carry out the second transform on the rows 40 (FIG. 4), the data is arranged such that the processing will not operate efficiently in parallel.

Accordingly, the data is read out of the memory elements 8 through output processor 18 and back through feedback path 24 and input sequencer 14 back into the line elements 30. The data is output through output processor 18 in order, firstly taking the first row of data, i.e. all of the first memory elements 8 of each of the columns 30, then the second row including the second memory elements 8 of each column 30, and so on. Thus, in the example, the data is output through output processor 18 in the order $D_{0,0} D_{0,8} D_{0,16} \ldots D_{0,56}$, $D_{1,0} \ldots D_{7,56}, D_{0,1}, D_{0,10} \ldots D_{7,63}$. This is then read back in into the memory elements 8 in the same way as before, starting with the first eight elements stored into the first column 30, and so on. This reorders the data into a different second pattern as follows:

| Column | Data |
| --- | --- |
| 0 | $D_{0,0} D_{0,8} D_{0,16} \ldots D_{0,56}$ |
| 1 | $D_{1,0} D_{1,17} \ldots D_{1,57}$ |
| . . . | |
| 63 | $D_{7,7}, D_{7,15} D_{7,23} \ldots D_{7,63}$ |

This reordered data is arranged suitably for parallel processing the DCT on the rows 40 efficiently.

Consider now the case that the same processor is to carry out pixel operations on each pixel. The data in the previous state can be read out of the line elements through output processor 18 and back through feedback path 24 and input sequencer back into the memory elements 8 exactly as before. In other words, this represents a second pass of the data through the feedback path 24. This reorders the data once again, resulting in a different third pattern as follows:

| Column | Data |
| --- | --- |
| 0 | $D_{0,0} D_{1,0} D_{2,0} \ldots D_{7,0}$ |
| 1 | $D_{0,1} D_{1,1} D_{2,1} \ldots D_{7,1}$ |
| . . . | |
| 63 | $D_{0,63}, D_{1,63} D_{2,63} \ldots D_{7,63}$ |

Thus, the reordered data has the first pixel of each of the eight blocks in the first column, the second pixel of each of the eight blocks in the second column, and so on until the final pixel of each of the eight blocks.

This data arrangement is very convenient for efficiently carrying out a number of pixel based operations, such as ZigZag scan, Quantization, etc.

Note that the use of the feedback path has allowed the data to be reordered without the need to store each data item in the input sequencer 14 first, even though in this case the reordering is very substantial—the first column even has one element from the last block. Thus, if the data was to be read sequentially into the columns, starting with the first column, the first column could only be completed after the last block was received. This would require significant data storage in input sequencer 14 if the reordering was to be carried out by the input sequencer alone without the two passages through loop 24 used in the example. Indeed, the input sequencer would need to have enough memory to store essentially the whole of the data processed at any one time.

In this example a complex reordering has been carried out without the need to store data in the input sequencer at all.

The feedback path 24 allows the same data to be processed in multiple different ways, reordering the data in the input sequencer 14 each time to arrange the data correctly for each processing operation. Thus, the data may be arranged for one processing operation, that operation carried out, and then rearranged for subsequent processing operations that are more efficient using different orderings.

Note that the final data order could be achieved in a different way if the input data was sequenced into rows in the memory elements 8, that is to say if the sequence of input data items was filled into the memory array 6 by rows, starting with the first row and then continuing with subsequent rows. The multiple passes through the feedback path achieve the same effect. The input sequencer may be arranged to directly store the data in the memory elements 8 in this way.

The above examples are relatively simple. However, the use of the invention is particularly useful in much larger processor and memory arrays, for example arrays of 320 or 640 processors, or even more, that can process whole lines of image data in parallel at once. There might, for example, be 64 memory elements 8 in each column 30. The invention allows such larger arrays to process large amounts of data in parallel.

The reduction in memory in the input sequencer 14 using the feedback path 24 is particularly significant in such larger arrays. In these cases, there is a trade off between the amount of memory in the input sequencer 14 and the number of passes through the feedback path required to arrange the data in the required arrangement in the memory elements 8. At one extreme, with an input sequencer with the same amount of memory as the memory array it is possible to rearrange data into any pattern without the feedback path.

However, in general the amount of memory in input sequencer 14 that this approach would require for large memory arrays would be prohibitive. Further, in that case, the input sequencer could not in general start writing data until it had received almost all of the data which could lead to processing delays. The use of the feedback path allows more interleaving for a given amount of memory than would otherwise be possible.

In preferred embodiments, the input sequencer 14 is arranged to arrange the data in more than one way to allow data to be processed differently.

Figure 5:
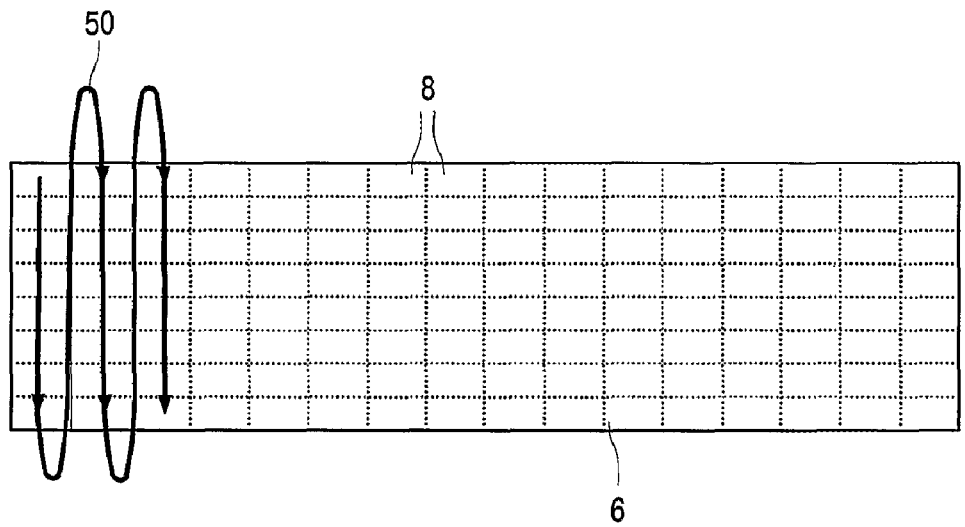
FIG. 5 illustrates schematically a block processing mode.
Figure 6:
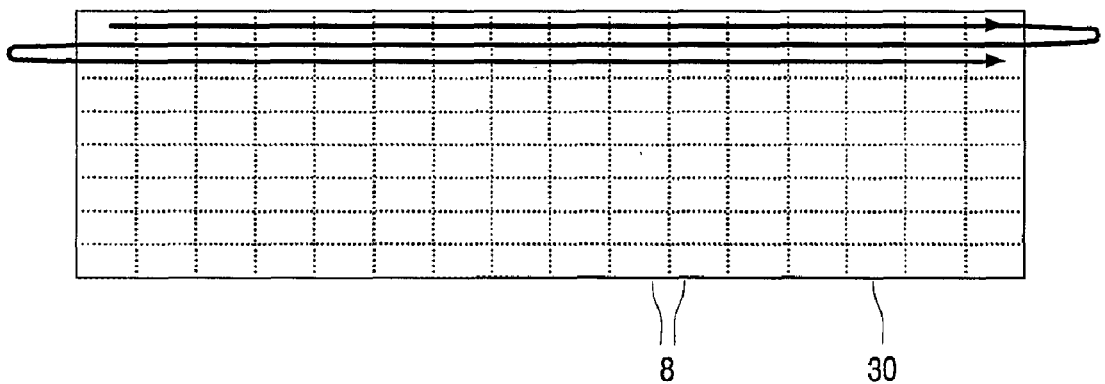
FIG. 6 illustrates schematically a line processing mode.

FIGS. 5 and 6 illustrate in general terms two ways the input sequencer can arrange the data; in general there may be further ways not shown here depending on the exact intended use of the SIMD array.

In broad terms, in a first mode, referred to as a column mode, illustrated in FIG. 5, input data items arriving at input 12 will be stored in the elements starting with the first column. Then, when the first column is full, the data elements will be stored in the next column, as indicated by arrows 50.

In the column mode, input data arriving in blocks is grouped together in line elements as far as possible to keep the data from one block in as few line elements as possible. This enables the processor elements 4 to deal simultaneously with different blocks in parallel, since the different blocks are in different line elements. For block based processing, this allows each processor to operate efficiently in parallel since each processor element 4 operates as far as possible on a respective line element 30 which contains a block of data.

It will be appreciated that if the length of the block does not match the number of memory elements 8 in each column 30 then there will not be an exact correspondence between blocks of data and columns. This can be dealt with in a number of ways, for example by filling a each column with a reduced number of elements. For example, in the case of a column of data used to store two pixel values expressed in as RGB (red green blue) values, there will be three values to be stored for each pixel. In this case, each column of eight memory elements can be used to store two pixels, leaving two of the eight memory elements empty.

A second mode of operation will be referred to as a row mode, in which the input sequencer takes input data items and distributes them in rows across the memory elements. Thus, in this mode of operation, illustrated in FIG. 6, the input sequencer 14 starts by filling up the first row, with the first data item stored in the first column, and subsequent data items in each column sequentially until the first row is complete. Then, the second row is filled, followed by the third row and so on. This stops when there is no more data or when the array is full.

The row mode is particularly suitable for dealing with lines of data in parallel, for example where the data arrives in the form of a line of data, i.e. a sequence of data items representing a line of an image.

As mentioned above, this row mode can be achieved either by directly storing data into the memory elements 8 in rows or by storing them initially in columns and using the feedback path 24 to reorder to data into rows.

As in the column mode, the rows need not be completely filled which can be useful if the length of each row is not commensurate with the lines of data being processed.

It will be appreciated that the blocks of data in the column mode and the lines of data in the row mode both arrive simply as a grouped sequence of data items on input 12, and whether the data is a "block" or a "line" cannot be determined by inspection of the data.

A mode of operation in which the data is sent around the loop of input sequencer 14, memory elements 8, output processor 18, and feedback path 24 back to the input sequencer 14 acts as a reordering mode. An example of this more complex mode of operation than the row mode or the column mode was presented above.

By providing a choice of modes the embodiment described allows a single SIMD array to carry out a variety of processing tasks.

As in the specific example above, the various modes and corresponding patterns of data stored in the memory elements can be achieved either by directly storing the data in the memory elements in the desired pattern or by flowing data round the feedback path.

The processor array is particularly suited to video processing where some operations are conveniently carried out on data line by line and other operations on data in blocks. The integrated circuit arrangement of the embodiment can efficiently carry out this variety of processing tasks.

Those skilled in the art will realise that many variations to the embodiments described are possible. For example, those skilled in the art will realise that other approaches to access the data of a line than direct memory access are possible.

The number of processor elements can be adjusted and it is not necessary to have the same number of processor elements as memory elements.

The approach may be used with a multiple instruction multiple data (MIMD) array as well as with the SIMD described above.

The memory array need not be located separately from the processor array but may in embodiments be made up of memory elements integral with the processors, in which case the memory elements may be referred to as registers.

Arrangements such as those described in WO2006/027751 may also be used. In particular, processing elements may be arranged not just to be able to access one column of memory elements but also neighbouring columns corresponding to neighbouring processing elements.

Further, although in the embodiments described no processing or sequencing elements are provided along the feedback path, alternative embodiments may include such additional processing or sequencing along the feedback path.

The invention claimed is:

1. An integrated circuit arrangement, comprising:
   a processor array with a plurality of processor elements for processing data in parallel;
   a memory array including a plurality of memory elements accessible in parallel by the plurality of processor elements;
   a data input for accepting data;
   an input sequencer arranged to accept input data and to store data in the memory elements of the memory array;
   an output processor for taking data from the memory array; and
   a controller for controlling the processor array;
   the integrated circuit arrangement further comprising a feedback path from the output processor to the input sequencer, the input sequencer being arranged to accept input data from the data input and from the feedback path and the output processor being arranged to take data from the memory array and to output the data from the memory array on an output of the output processor and to send the data from the memory array back to the input sequencer along the feedback path.

2. An integrated circuit arrangement according to claim 1 wherein the memory array includes an array of columns, each of the columns including a column of a plurality of the memory elements, each of the columns being addressable by a respective one or more of the processor elements.

3. An integrated circuit arrangement according to claim 2 wherein the controller is arranged to cause the processor array to operate selectably in one of a plurality of modes, in which the input data is stored in the memory elements in different arrangements depending on the selected mode.

4. An integrated circuit arrangement according to claim 3 wherein one of the modes is a column processing mode in which the input sequencer is arranged to accept a sequence of data items as input data and to store the data items in the memory elements starting with the one of the columns of memory elements, followed by subsequent columns of memory elements in turn.

5. An integrated circuit arrangement according to claim 3, wherein one of the modes is a row processing mode in which the input sequencer is arranged to accept a sequence of data items as input data and to output the data items in the memory elements in rows starting with one of the rows of memory elements followed by subsequent rows of memory elements in turn.

6. An integrated circuit arrangement according to claim 3 wherein one of the modes is a reordering mode in which the input sequencer is arranged to accept a sequence of data items as input data and to output the data items to the memory elements in a reordered sequence in the memory elements other than in order of the rows or columns of memory elements.

7. An integrated circuit arrangement according to claim 6 wherein in the reordering mode the controller is arranged to cause data items to flow around the path from the input sequencer, memory elements, output processor and feedback path back to the input sequencer to store the data items in the memory elements in the reordered sequence.

8. An integrated circuit arrangement processor array according to claim 1 wherein the integrated circuit arrangement is arranged to store input data in the memory elements in a first pattern, to carry out processing on the data in that pattern, and then to output data from the memory elements through feedback path and input sequencer to rearrange the data in a different pattern in the memory elements and then to carry out further processing on the data in that different pattern.

9. A method of operating an integrated circuit arrangement having an input sequencer, a processor array with plurality of processor elements for processing data in parallel, a memory array having a plurality of memory elements accessible in parallel by the plurality of processor elements; an output processor for taking data from the memory array and a feedback path from the output processor to the input sequencer, the method comprising:
   accepting input data in the input sequencer;
   storing the input data in the memory elements in a first pattern; and
   outputting the data from the memory elements and sending the output data back through the output processor, the feedback path and the input sequencer and back into the memory elements in a different second pattern.

10. A method according to claim 9 wherein the memory elements are arranged in rows and columns, each of the columns being addressable by a respective one or more of the processor elements, the method further comprising:
    causing the integrated circuit arrangement to operate selectably in one of a plurality of modes, wherein the input sequencer is arranged to store input data in the memory elements in different arrangements depending on the selected mode.

11. A method according to claim 10 wherein one of the modes is a column processing mode comprising:
    accepting a sequence of data items as input data; and
    storing the data items in the memory elements starting with the one of the columns of memory elements, followed by subsequent columns of memory elements in turn.

12. A method according to claim 10, wherein one of the modes is a row processing mode comprising:
    accepting a sequence of data items as input data; and
    storing the data items in the memory elements in rows starting with one of the rows of memory elements followed by subsequent rows of memory elements in turn.

13. A method according to claim 10 wherein one of the modes is a reordering mode comprising:
    accepting a sequence of data items as input data; and
    storing the data items to the memory array in a reordered sequence in the memory elements.

14. A method according to claim 13 comprising, in the reordering mode, storing the data items to the memory array, outputting the data items from the memory array and sending the data items back through the feedback path to store the data items in the memory elements in the reordered sequence.

15. A non-transitory computer program product including computer program code means arranged to cause a processor array with a plurality of processor elements for processing data in parallel;
    a memory array including a plurality of memory elements accessible in parallel by the plurality of processor elements;
    a data input for accepting data;
    an input sequencer arranged to accept input data and to store data in the memory elements of the memory array;
    an output processor for taking data from the memory array; and a controller for controlling the processor array;

the integrated circuit arrangement further comprising a feedback path from the output processor to the input sequencer, the input sequencer being arranged to accept input data from the data input and from the feedback path and the output processor being arranged to take data from the memory array and to output the data from the memory array on an output of the output processor and to send the data from the memory array back to the input sequencer along the feedback path to execute the method comprising:

accepting input data in the input sequencer;

storing the input data in the memory elements in a first pattern; and outputting the data from the memory elements and sending the output data back through the output processor, the feedback path and the input sequencer and back into the memory elements in a different second pattern.

* * * * *

UNITED STATES PATENT AND TRADEMARK OFFICE
CERTIFICATE OF CORRECTION

PATENT NO. : 8,078,830 B2  
APPLICATION NO. : 12/302171  
DATED : December 13, 2011  
INVENTOR(S) : Richard P. Kleihorst et al.

Page 1 of 1

It is certified that error appears in the above-identified patent and that said Letters Patent is hereby corrected as shown below:

On the Title Page, item (75) Inventors:
change "Antench A. Abbo" to --Anteneh A. Abbo--.

Signed and Sealed this
Fifth Day of August, 2014

Michelle K. Lee
*Deputy Director of the United States Patent and Trademark Office*